(12) United States Patent
Huang (10) Patent No.: US 8,607,662 B2
(45) Date of Patent: Dec. 17, 2013

(54) WALL-MOUNTED FAUCET CONTROL COMPONENTS

(75) Inventor: Li-Chen Huang, Changhua (TW)

(73) Assignee: Alexander Yeh Industry Co. Ltd., Changhua (TW)

( * ) Notice: Subject to any disclaimer, the term of this patent is extended or adjusted under 35 U.S.C. 154(b) by 330 days.

(21) Appl. No.: 13/205,956

(22) Filed: Aug. 9, 2011

(65) Prior Publication Data

US 2013/0036854 A1    Feb. 14, 2013

(51) Int. Cl.
*F16K 31/60*    (2006.01)

(52) U.S. Cl.
CPC ..................... *F16K 31/60* (2013.01)
USPC .......... 74/543; 74/548; 137/625.41; 137/359; 137/315.15; 251/288

(58) Field of Classification Search
USPC ................... 74/543–548; 137/801, 269, 359, 137/625.41; 251/288, 292, 323; 16/414, 16/441; 4/678
See application file for complete search history.

(56) References Cited

U.S. PATENT DOCUMENTS

| | | | | |
|---|---|---|---|---|
| 1,989,083 | A | * | 1/1935 | Dahnken et al. ............... 403/288 |
| 3,250,148 | A | * | 5/1966 | Soles .............................. 74/548 |
| 4,593,430 | A | * | 6/1986 | Spangler et al. ................ 16/441 |
| 5,671,904 | A | * | 9/1997 | Minutillo ......................... 251/96 |
| 5,741,003 | A | * | 4/1998 | Segien, Jr. ....................... 251/95 |
| 6,438,771 | B1 | * | 8/2002 | Donath et al. ..................... 4/678 |
| 2013/0036855 | A1 | * | 2/2013 | Huang ............................ 74/543 |

* cited by examiner

*Primary Examiner* — Vinh Luong (74) *Attorney, Agent, or Firm* — Che-Yang Chen; Law Office of Michael Chen (57) ABSTRACT

A wall-mounted faucet control component includes a control handle, a conversion block and a restricting device, wherein two spaced protruding ribs are located at the periphery of the opening of a receiving space of the control handle, and a connecting pole is protrudingly formed at the center of the opening surface of the receiving space. The conversion block is located at the receiving space of the control handle, wherein two recessed slots are spacedly and recessedly formed at the periphery of the conversion block, and the recessed slots are engaged with the protruding ribs of the control handle. According to the abovementioned structure, since the detachable conversion block is formed at the receiving space of the control handle, it can be used for water control bases of different sizes to increase the practicability of the faucet handle and increase the convenience in assembly process.

5 Claims, 10 Drawing Sheets

WALL-MOUNTED FAUCET CONTROL COMPONENTS

FIELD OF THE INVENTION

The present invention relates to wall-mounted faucet control components, and more particularly refers to a receiving space of a control handle having a detachable conversion block that can be applied to different sizes of water control bases, to increase the applicability of the faucet handle and convenience for assembly.

BACKGROUND OF THE INVENTION

In recent years, the "DIY" style has become popular and people focus more on entire appearance of the faucet, so most people try to replace the faucet handle by themselves start to get rid of the appearance of the old faucet and achieve the goal of changing the exterior of the faucet and eliminating the old thereof. However, various faucets are different in sizes that cause the corresponding the faucet handles vary in size as well, and it is difficult for customers to purchase a suitable faucet handle, which further cause a problem in assembling and replacing the faucet. This is the problem the present invention wants to solve.

SUMMARY OF THE INVENTION

The technical problem to be solved in the present invention is that various faucets are different in sizes that cause the corresponding the faucet handles vary in size as well, and it is difficult for customers to purchase a suitable faucet handle, which further cause a problem in assembling and replacing the faucet. This is the problem the present invention wants to solve.

The technical point to solve the problem mentioned above is that the present invention provides a wall-mounted faucet control device including: a control handle, one side of which recessedly forms a receiving space having two protruding ribs spacedly located at the periphery of an opening. A connecting pole is protrudingly formed at the center of the receiving space and a plugging slot is formed near the connecting pole. The other side of the control handle recessedly forms a trough that has a through hole through an opening surface of the trough and connecting to the plugging slot. The through hole has a locking unit. The wall-mounted faucet control device also has a conversion block located at the receiving space of the control handle. Two recessed slots are recessedly and spacedly formed at the periphery of the conversion block and the recessed slots are engaged with the protruding ribs of the control handle. The wall-mounted faucet control device further includes a restricting device located at the receiving space of the control handle. The restricting device has a sleeve and a restricting unit, wherein the sleeve has a wedging rib protrudingly formed at the outer periphery of the sleeve, and an inner gear ring at the inner periphery of the sleeve. An outer gear ring is formed at the periphery of one end of the restricting unit and engaged with the inner gear ring. The other end of the restricting unit has a supporting surface expandably against the opening end of the sleeve, and a stopping block is protrudingly formed at the periphery of the supporting surface, wherein the stopping block is provided to be against the protruding ribs. As such, the wall-mounted faucet control device is formed.

Comparing with conventional techniques, the present invention has the following advantages: (1) the detachable conversion block located at the receiving space of the control handle can be used in different water control bases with different sizes to increase the practicability of the faucet handle and further increase the convenience during assembly; and (2) when the control handle is used for larger water control base, the restricting device can be assembled before assembling the control handle, so that the relative position between the stopping block and the wedging rib can be adjusted by the engaging position of the outer gear ring of the restricting unit and the inner gear ring of the sleeve. When the control handle is rotated, the protruding rib can be against the stopping block of the restricting unit and the wedging rib of the sleeve to reduce the rotating angle of the control handle, and further achieve the purpose of reducing the water flow to the maximum extent. This design can also prevent the control handle from overly rotating which may cause overly high water temperature and water flow, to further achieve the goal of water saving and avoiding burns.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
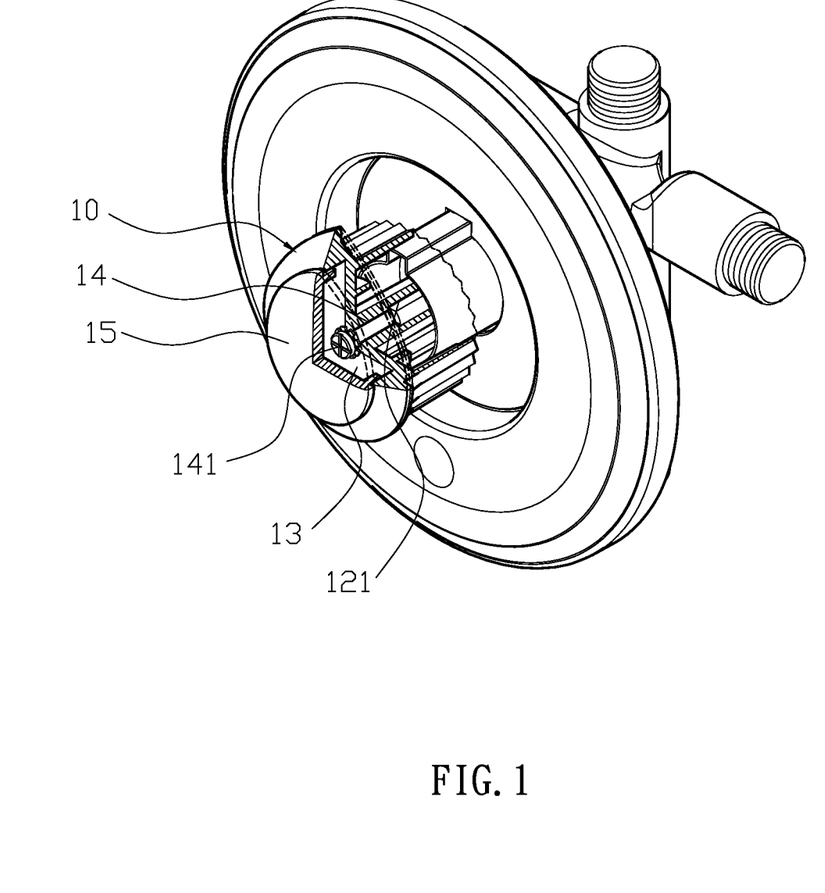
FIG. 1 illustrates a three-dimensional assembled view in the present invention.
Figures 2, 3:
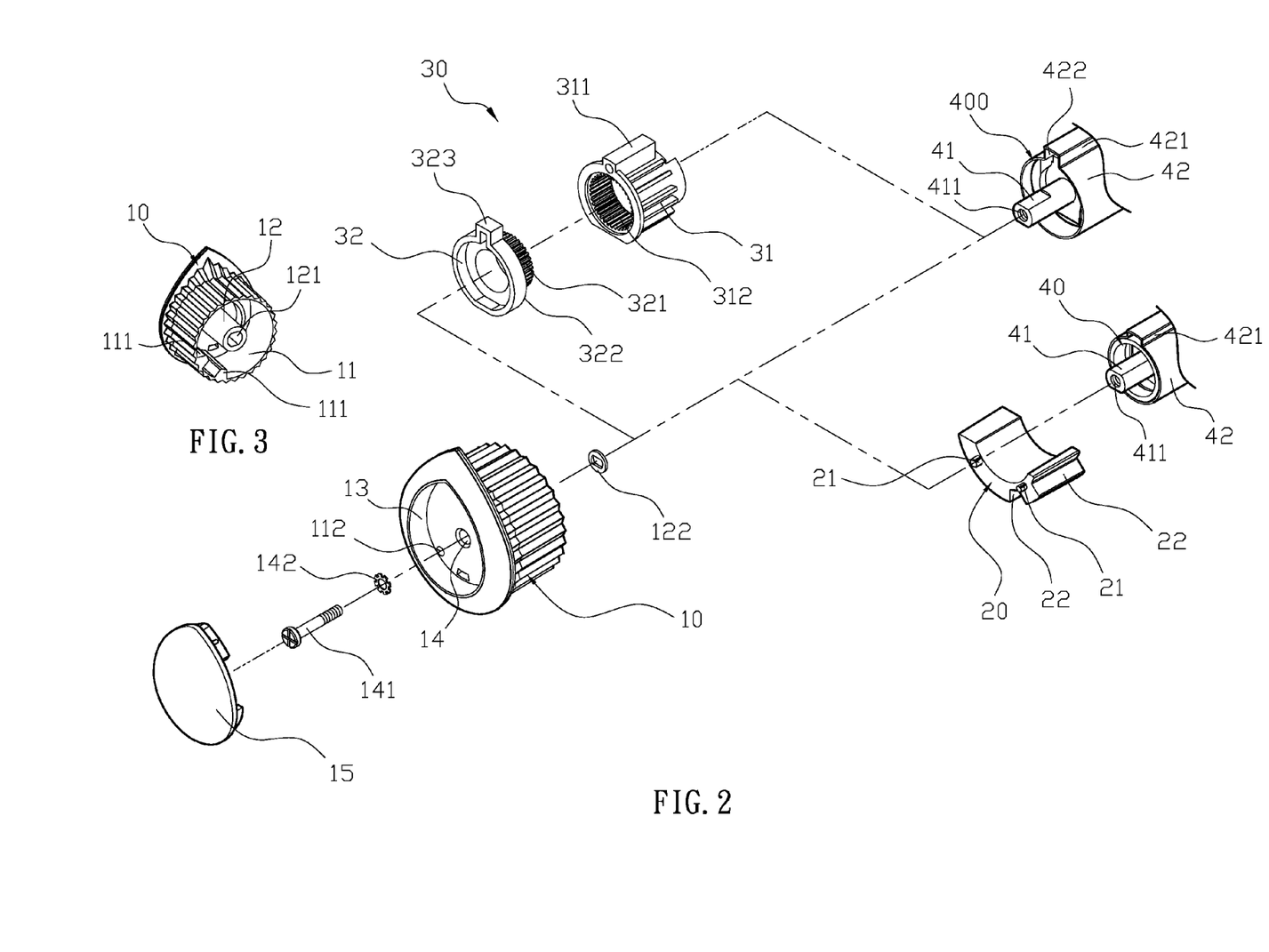
FIG. 2 illustrates a three-dimensional exploded view in the present invention.
FIG. 3 illustrates a three-dimensional view of the control handle in another angle in the present invention.

In order to further understand the goal, characteristics and effect of the present invention, a number of embodiments along with the drawings are illustrated as following:

Referring to FIGS. 1 to 3, a wall-mounted faucet control component includes: a control handle (10), a conversion block (20) and a restricting device (30), wherein one side of the control handle (10) recessedly forms a receiving space (11) having two protruding ribs (111) spacedly located at the periphery of an opening, and a plurality of positioning holes (112) through the opening surface. A connecting pole (12) is protrudingly formed at the center and a plugging slot (121) that provides a gasket (122) is formed near the connecting pole (12). The other side of the control handle (10) recessedly forms a trough (13) that has a through hole (14) through an opening surface of the trough (13) and connecting to the plugging slot (121). The through hole (14) has a locking unit (141) and an anti-loosening gasket (142), and the trough (13) has a cover (15) to achieve the purpose of hiding the locking unit (141). One side of the conversion block (20) recessedly forms a plurality of positioning pole (21) that plugs into the positioning holes (112) of the control handle. Two recessed slots (22) are recessedly and spacedly formed at the periphery of the conversion block (20). The recessed slot (22) is engaged with the protruding rib (111) of the control handle (10). The restricting device (30) has a sleeve (31) and a restricting unit (32), wherein the sleeve (31) has a wedging rib (311) protrudingly formed at the outer periphery of the sleeve (31), and an inner gear ring (312) at the inner periphery of the sleeve (31). An outer gear ring (321) is formed at the periphery of one end of the restricting unit (32) and engaged with the inner gear ring (312). The other end of the restricting unit (32) has a supporting surface (322) expandably against the opening end of the sleeve (31), and a stopping block (323) is protrudingly formed at the periphery of the supporting surface (322), wherein the stopping block (323) is provided to be against the protruding ribs (111).

Figure 4:
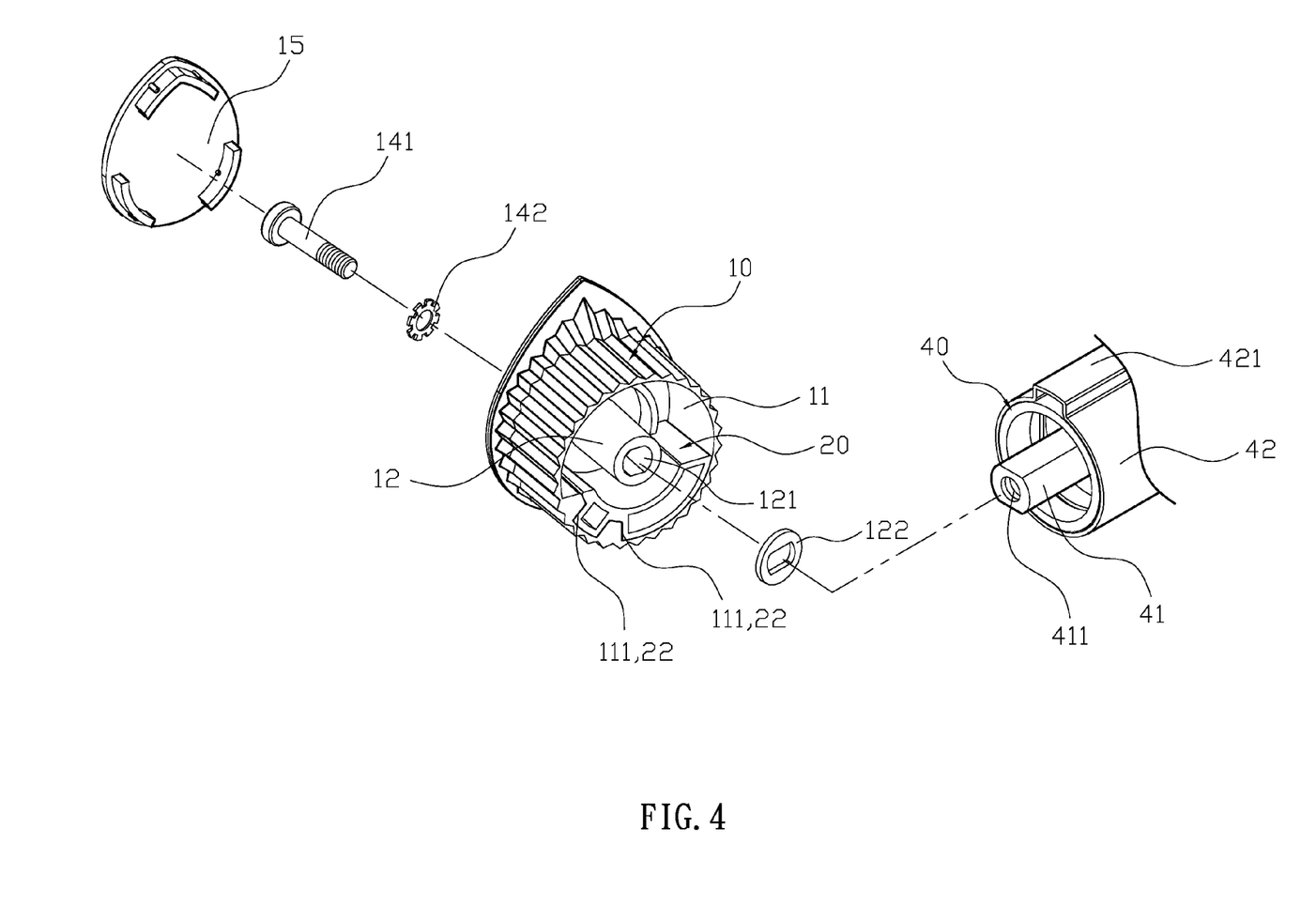
FIG. 4 illustrates a schematic view of the first assembly type in the present invention.
Figure 5:
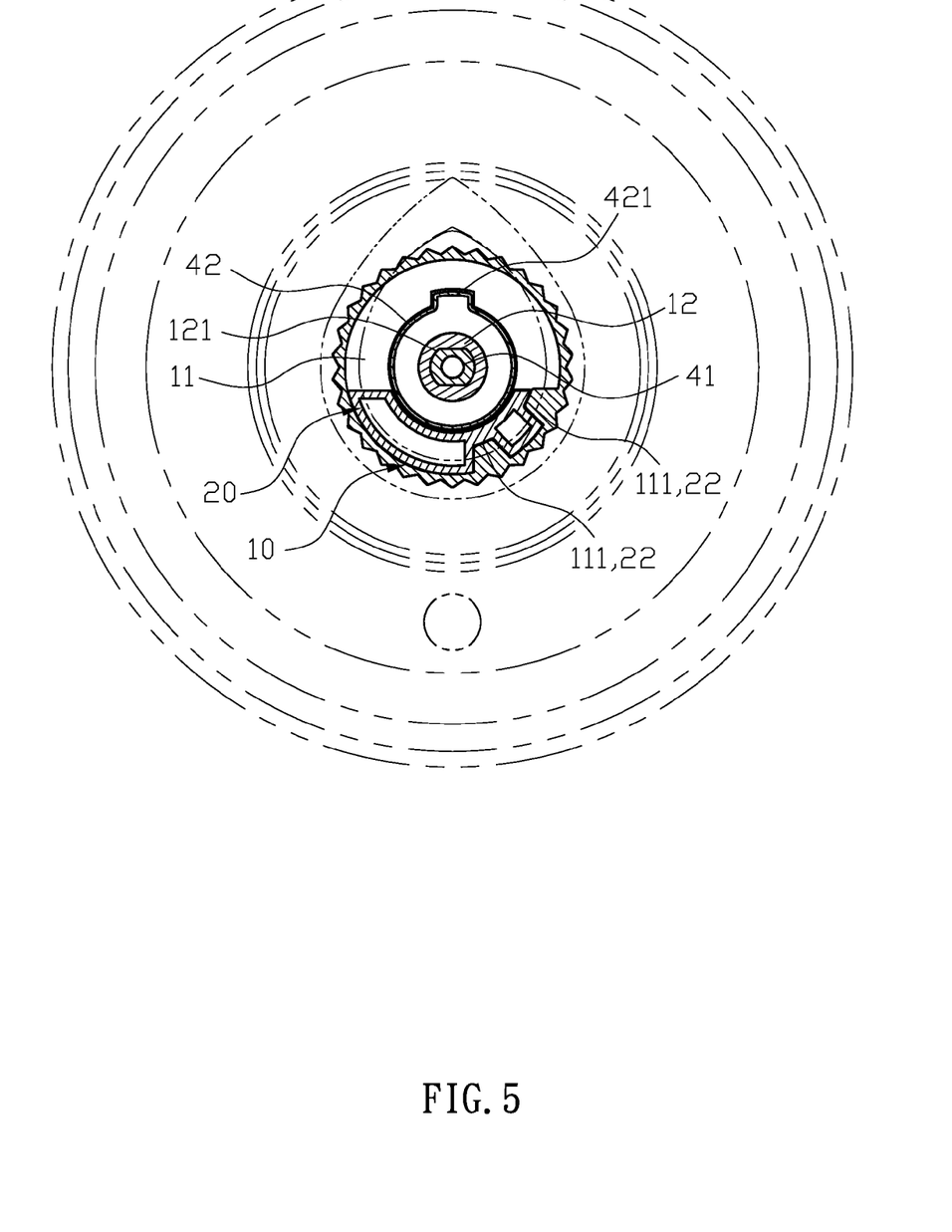
FIG. 5 illustrates a first sectional view of the first assembly type in the present invention.
Figure 6:
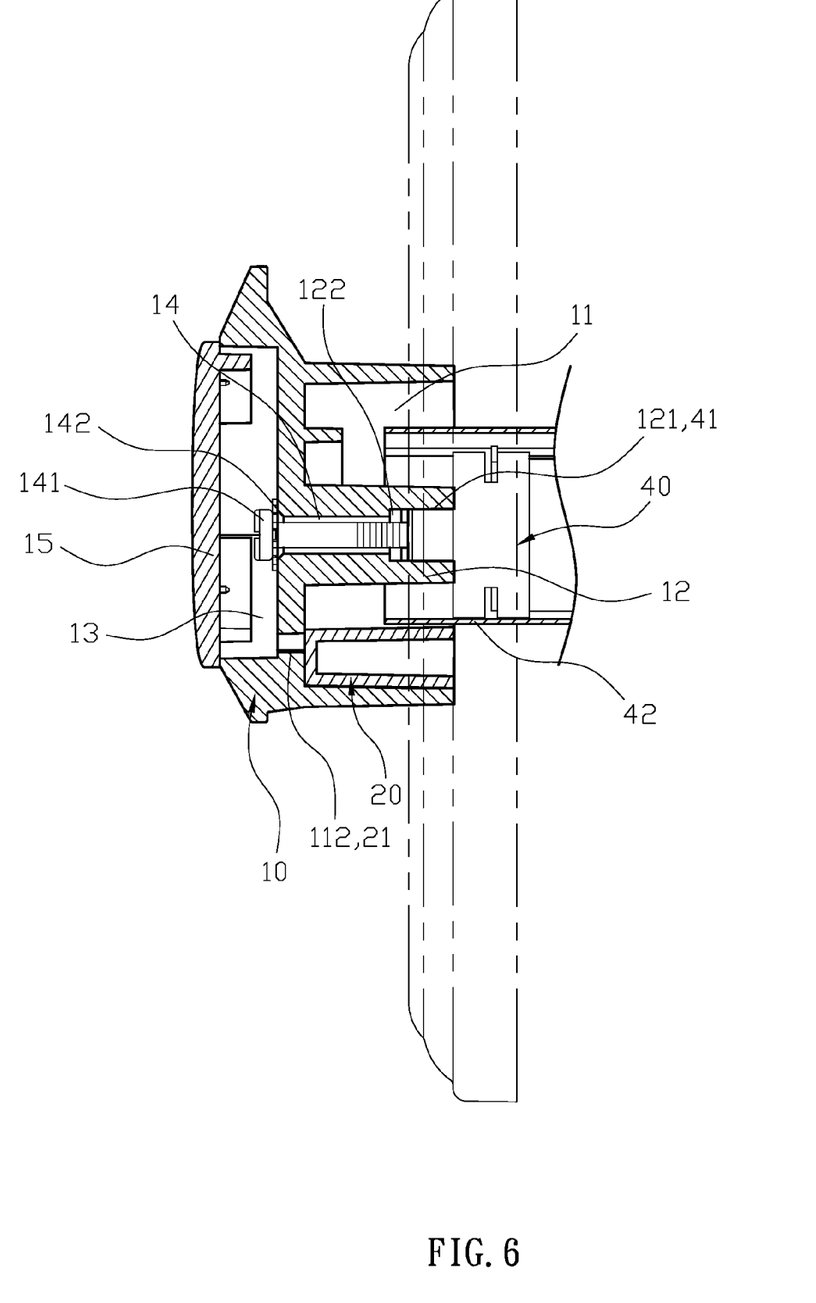
FIG. 6 illustrates a second sectional view of the first assembly type in the present invention.
Figure 7:
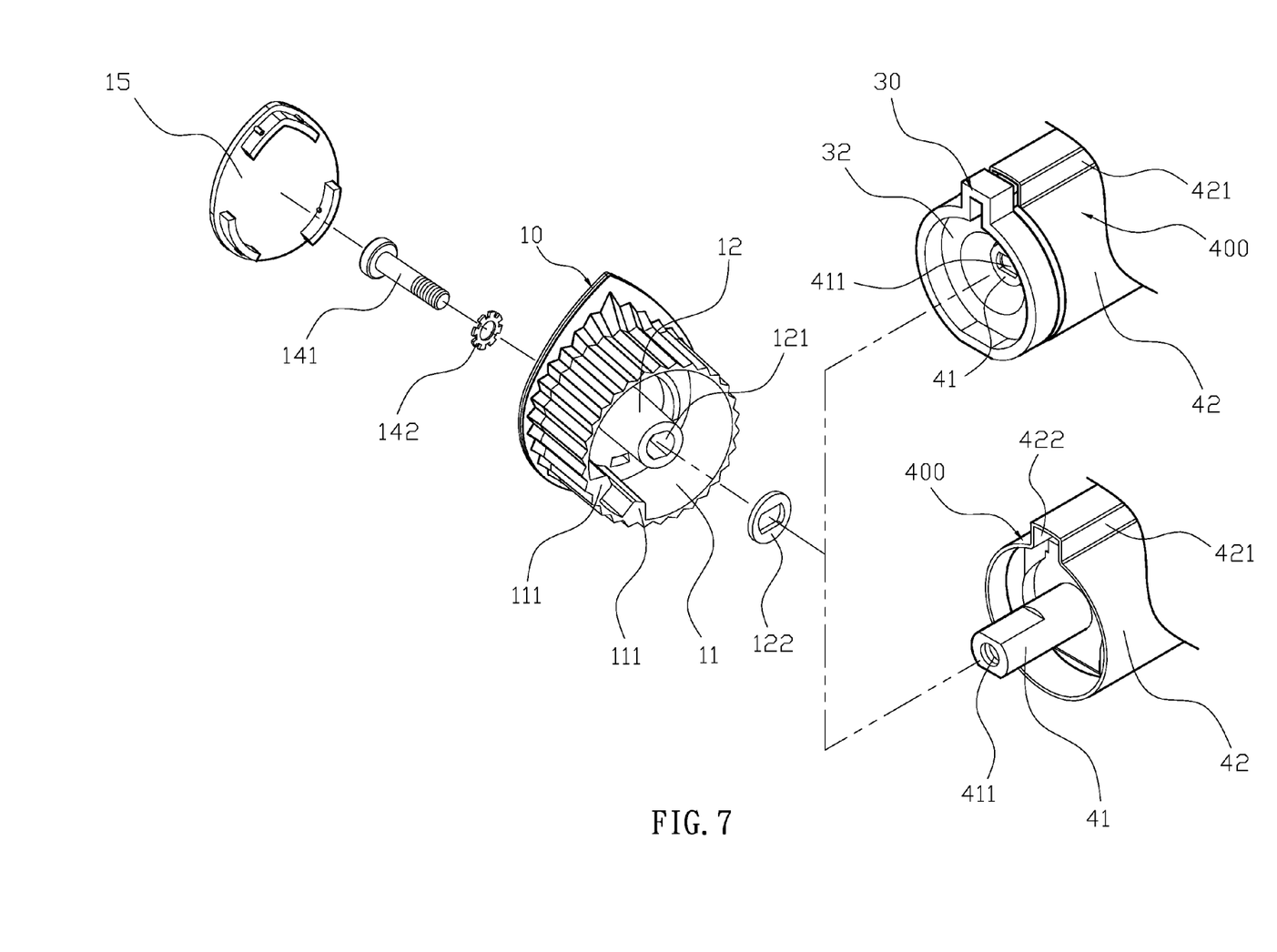
FIG. 7 illustrates a schematic view of the second and third assembly types in the present invention.
Figure 8:
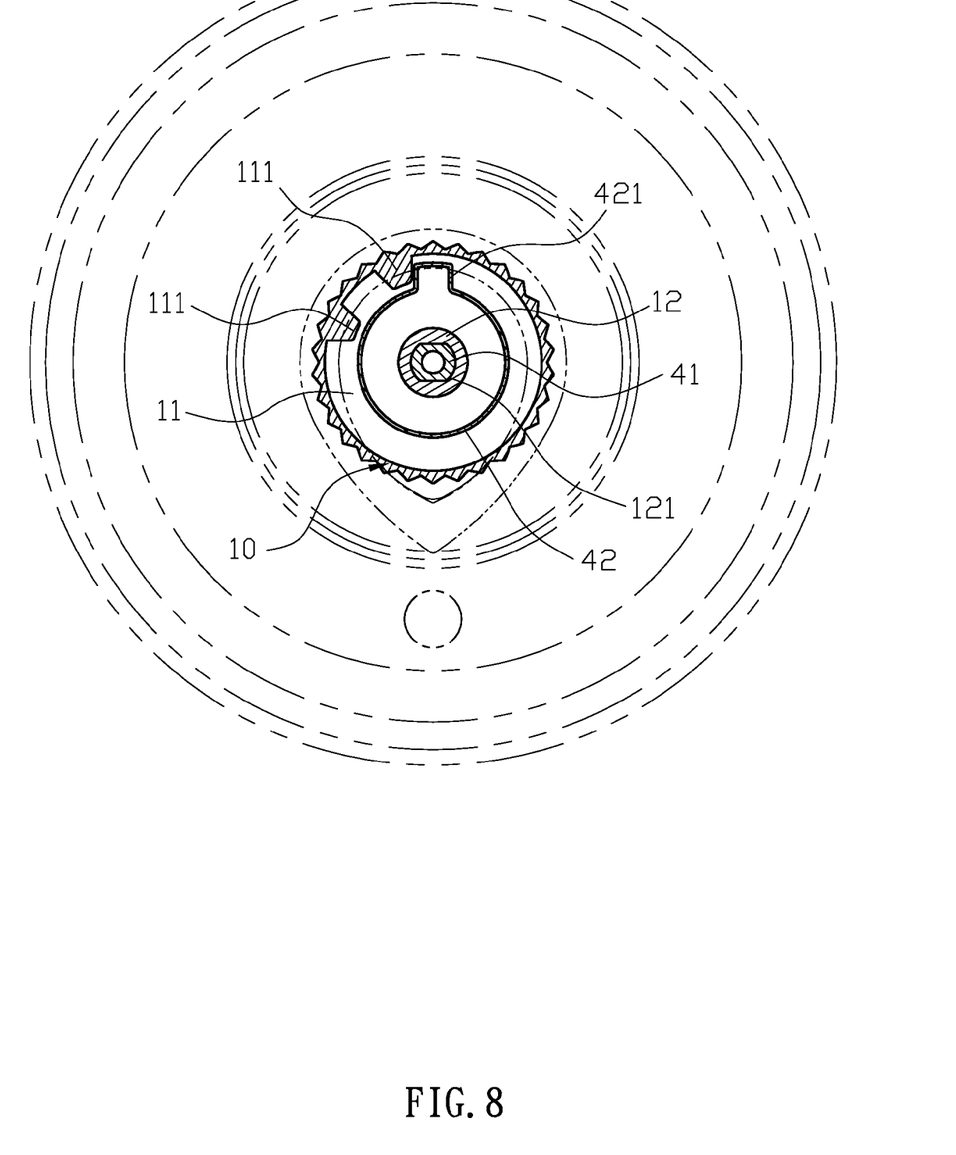
FIG. 8 illustrates a first sectional view of the second assembly type in the present invention.
Figure 9:
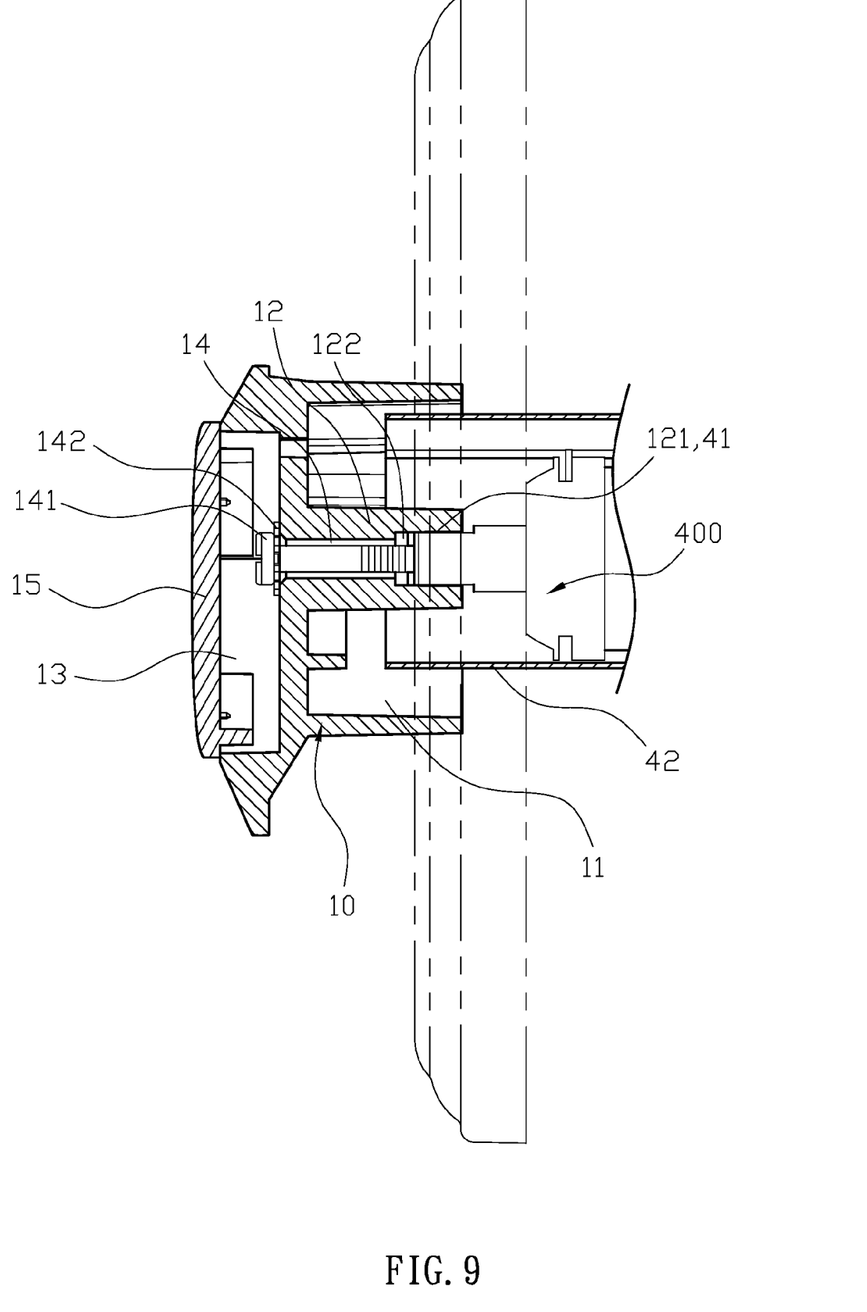
FIG. 9 illustrates a second sectional view of the second assembly type in the present invention.

Referring to FIG. 2 for a practical use in the present invention, the control handle of the faucet can be conjugated with a first water control base (40) and a second control base (400) with different sizes. The water control bases (40) (400) protrudingly form a valve stick (41) that recessedly forms a connecting slot (411). A second sleeve (42) is formed at outer periphery of the water control bases (40) (400) and the second sleeve (42) protrudingly forms a stopping portion (421) located at the outer periphery in the axial direction. The stopping portion (421) of the second water control base (400) has a restricting slot (422) at the inner periphery. Referring to FIGS. 2, 5 and 6, when the control handle (10) is conjugated with the smaller water control base (40), the conversion block (20) points to the receiving space (11) of the control handle (10) with the positioning pole (21), and recessed slot (22) of the conversion block (20) slides into the protruding rib (111) of the control handle (10), so that the positioning pole (21) of the conversion block (20) can be plugged into the positioning hole (112) of the control handle (10) (see FIG. 4). Also, the gasket (122) is disposed at the plugging slot (121) of the control handle (10) that is then plugged into the valve stick (41) of the water control base (40), and the locking unit (141) is inserted through the anti-loosening gasket (142) and the through hole (14) of the control handle (10), and is securely locked at the connecting slot (411) of the valve stick (41). The cover (15) is used to cover the trough (13) of the control handle (10) to complete the assembly for the water control base (40) with smaller size. When the control handle (10) is rotated, it can cause the valve stick (41) to rotate to achieve the goal of controlling the temperature of the water flow. Moreover, when the protruding rib (111) of the control handle (10) is against the stopping portion (421) of the second sleeve (42), it can be secured at the stopping portion of the second sleeve (42) to achieve the purpose of blocking, so as to control the rotating angle of the control handle (10) as well as the water control base (40) with smaller size.

Figure 10:
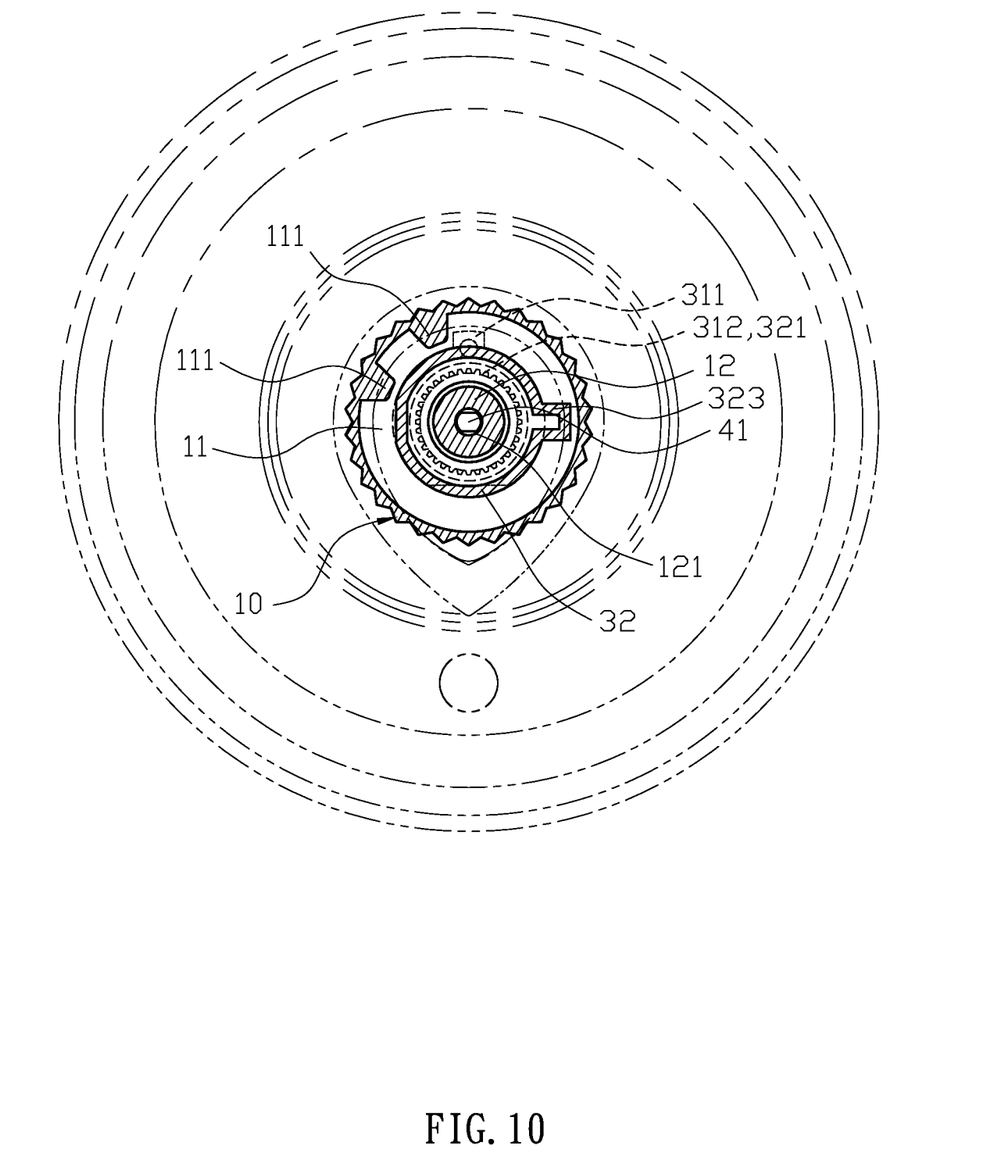
FIG. 10 illustrates a first sectional view of the third assembly type in the present invention.
Figure 11:
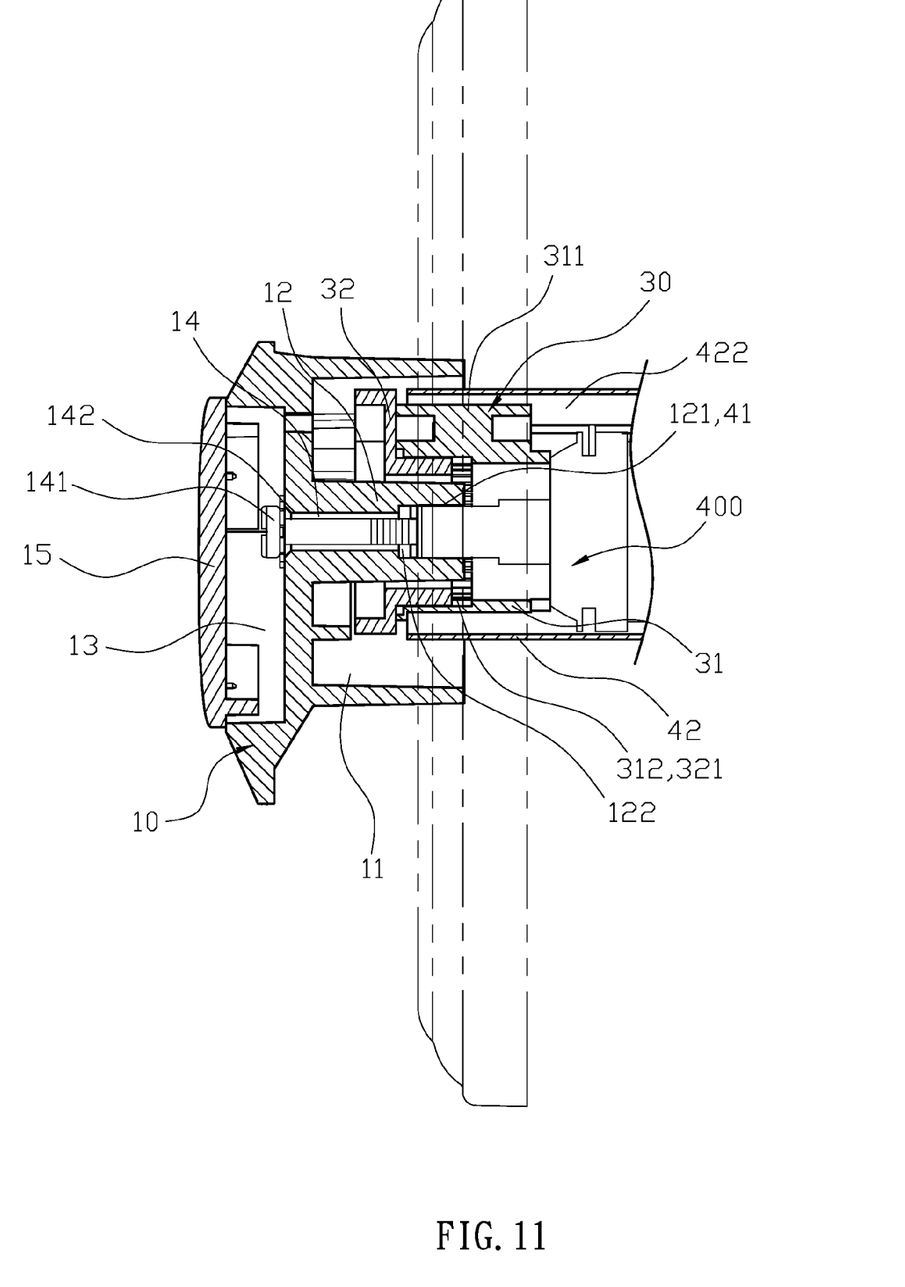
FIG. 11 illustrates a second sectional view of the third assembly type in the present invention.

Referring to FIGS. 2, 7, 8 and 9, when the control handle (10) is conjugated with the larger water control base (400), the gasket (122) is disposed at the plugging slot (121) of the control handle (10) that is then plugged into the valve stick (41) of the water control base (400), and the locking unit (141) is inserted through the anti-loosening gasket (142) and the through hole (14) of the control handle (10), and is securely locked at the connecting slot (411) of the valve stick (41). The cover (15) is used to cover the trough (13) of the control handle (10) to complete the assembly for the water control base (40) with smaller size. When the control handle (10) is rotated, it can cause the valve stick (41) to rotate to achieve the goal of controlling the temperature of the water flow. Moreover, when the protruding rib (111) of the control handle (10) is against the stopping portion (421) of the second sleeve (42), it can be secured at the stopping portion of the second sleeve (42) to achieve the purpose of blocking, so as to control the rotating angle of the control handle (10) as well as the water control base (400) with smaller size. Also referring to FIGS. 2, 10 and 11, if the user wants to further control the rotating angle of the control handle (10), the restricting device (30) can be assembled before assembling the control handle (10) (see FIG. 7), wherein the restricting slot (422) of the second sleeve (42) slides into the wedging rib (311) of the sleeve (31) of the restricting device (30), so that the supporting surface (322) of the sleeve (31) is against the opening end of the second sleeve (42). The restricting unit (32) is further inserted into the inner gear ring (312) of the sleeve (31) via the outer gear ring (321) to engage with each other, so that the relative position between the stopping block (323) and the wedging rib (311) can be adjusted by the engaging position (see FIG. 10). When the control handle (10) is rotated, the protruding rib (111) can be against the stopping block (323) of the restricting unit (32) and the wedging rib (311) of the sleeve (31) to reduce the rotating angle of the control handle (10), and further achieve the purpose of reducing the water flow to the maximum extent. This design can also prevent the control handle from overly rotating which may cause overly high water temperature and water flow, to further achieve the goal of water saving and avoiding burns.

According to the structure in the abovementioned embodiments, the present invention has the following advantages: (1) the detachable conversion block (20) located at the receiving space (11) of the control handle (10) can be used in different water control bases (40) (400) with different sizes to increase the practicability of the faucet handle and further increase the convenience during assembly; and (2) when the control handle (10) is used for larger water control base (40), the restricting device (30) can be assembled before assembling the control handle (10), so that the relative position between the stopping block (323) and the wedging rib (311) can be adjusted by the engaging position of the outer gear ring (321) of the restricting unit (32) and the inner gear ring (312) of the sleeve (31). When the control handle (10) is rotated, the protruding rib (111) can be against the stopping block (323) of the restricting unit (32) and the wedging rib (311) of the sleeve (31) to reduce the rotating angle of the control handle (10), and further achieve the purpose of reducing the water flow to the maximum extent. This design can also prevent the control handle from overly rotating which may cause overly high water temperature and water flow, to further achieve the goal of water saving and avoiding burns.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A wall-mounted faucet control device including:
   a control handle, one side of which recessedly forms a receiving space having two protruding ribs spacedly located at the periphery of an opening of the receiving space, and a connecting pole is protrudingly formed at the center of the receiving space, wherein a plugging slot is protrudingly formed near the connecting pole, and the other side of the control handle has a through hole that connects through the plugging slot and receives a locking unit;
   a conversion block located at the receiving space of the control handle, wherein two recessed slots are recessedly and spacedly formed at the periphery of the conversion block and the recessed slots are engaged with the protruding ribs of the control handle; and
   a restricting device, which is located at the receiving space of the control handle, having a sleeve and a restricting unit, wherein the sleeve has a wedging rib protrudingly formed at the outer periphery of the sleeve, and an inner gear ring at the inner periphery of the sleeve, and an outer gear ring is formed at the periphery of one end of the restricting unit and engaged with the inner gear ring, wherein the other end of the restricting unit has a supporting surface expandably against the opening end of the sleeve, and a stopping block is protrudingly formed at the periphery of the supporting surface, and the stopping block is configured to be against the protruding ribs.

2. The wall-mounted faucet control device of claim 1, wherein the receiving space has a plurality of positioning holes through an opening surface of the receiving space, and one side of the conversion block protrudingly forms a plurality of positioning poles which are used to plug into the positioning holes of the control handle.

3. The wall-mounted faucet control device of claim 1, wherein the plugging slot receives a gasket.

4. The wall-mounted faucet control device of claim 1, wherein a trough is protrudingly formed at the other end of the control handle, and the through hole is located at an opening surface of the trough, and the trough receives a cover.

5. The wall-mounted faucet control device of claim 1, wherein an anti-loosening gasket is disposed between the locking unit and the through hole.

* * * * *